US009493200B2

(12) United States Patent
Schwenk et al.

(10) Patent No.: US 9,493,200 B2
(45) Date of Patent: Nov. 15, 2016

(54) COUPLABLE DRIVE UNIT AND STEERING UNIT

(71) Applicant: IEM SCHWENK GMBH, Neuleiningen (DE)

(72) Inventors: Peter Schwenk, Neuleiningen (DE); Ludwig Thalhofer, Groebettlingen (DE)

(73) Assignee: IEM Schwenk GmbH, Neuleiningen (DE)

( * ) Notice: Subject to any disclaimer, the term of this patent is extended or adjusted under 35 U.S.C. 154(b) by 0 days.

(21) Appl. No.: 14/857,995

(22) Filed: Sep. 18, 2015

(65) Prior Publication Data

US 2016/0001833 A1 Jan. 7, 2016

Related U.S. Application Data

(62) Division of application No. 13/523,052, filed on Jun. 14, 2012, now abandoned.

(30) Foreign Application Priority Data

Jun. 15, 2011 (EP) ..................................... 11170038

(51) Int. Cl.
| | |
|---|---|
| *A63B 55/60* | (2015.01) |
| *B62B 5/00* | (2006.01) |
| *B62D 63/02* | (2006.01) |
| *B60K 17/16* | (2006.01) |
| *B62D 63/04* | (2006.01) |

(52) U.S. Cl.
CPC .............. *B62D 63/025* (2013.01); *A63B 55/30* (2015.10); *A63B 55/61* (2015.10); *B60K 17/16* (2013.01); *B62D 63/04* (2013.01); *A63B 2055/601* (2015.10); *B62B 5/005* (2013.01)

(58) Field of Classification Search
CPC ... B62B 5/0026; B62B 5/0036; B62B 5/005; B62M 7/14; B62M 7/16
USPC ...................................... 180/11, 12, 13, 14.2
See application file for complete search history.

(56) References Cited

U.S. PATENT DOCUMENTS

| | | | | |
|---|---|---|---|---|
| 2,919,758 | A * | 1/1960 | Newton | ................. B62K 5/027 180/208 |
| 3,575,250 | A | 4/1971 | Dykes | |
| 3,583,510 | A | 6/1971 | Hastings | |
| 3,891,043 | A * | 6/1975 | Valdex | .................. B62B 5/0026 180/13 |

(Continued)

FOREIGN PATENT DOCUMENTS

| | | |
|---|---|---|
| AU | 596 485 | 5/1990 |
| DE | 10 2007 062 406 A1 | 7/2009 |

(Continued)

*Primary Examiner* — Joseph Rocca
*Assistant Examiner* — Marc A Scharich
(74) *Attorney, Agent, or Firm* — Muirhead and Saturnelli, LLC

(57) ABSTRACT

A drive unit couples to a steering unit for a multi-axle vehicle for conveying a passenger. The drive unit includes a chassis configured as a supporting structure of the drive unit, a drive module with a motor and a first axle with wheels for driving the vehicle, a coupling device for coupling the drive unit to the steering unit, an operating element for operating the drive module, and a seat arrangement for supporting the passenger. The drive unit is also configured such that a total center of mass of the drive unit is arranged in the longitudinal direction of the vehicle in front of the first axle. A corresponding steering unit and a vehicle comprising a corresponding drive unit and a steering unit are also disclosed.

16 Claims, 5 Drawing Sheets

(56) References Cited

U.S. PATENT DOCUMENTS

| | | | | |
|---|---|---|---|---|
| 4,461,365 A * | 7/1984 | Diggs | ............... | B62M 7/16 180/11 |
| 4,503,925 A * | 3/1985 | Palmer | ............... | A61G 5/047 180/13 |
| 4,750,578 A * | 6/1988 | Brandenfels | ............... | B62B 5/0026 180/13 |
| 4,757,868 A * | 7/1988 | Cresswell | ............... | B62K 5/025 180/11 |
| 4,771,840 A * | 9/1988 | Keller | ............... | B62B 5/0026 180/11 |
| 5,718,534 A * | 2/1998 | Neuling | ............... | B60K 17/043 180/11 |
| 5,876,085 A * | 3/1999 | Hill | ............... | B60N 2/542 296/65.02 |
| 6,270,093 B1 * | 8/2001 | Johnson | ............... | B62B 3/144 280/33.993 |
| 6,494,542 B1 * | 12/2002 | Watt | ............... | B24B 7/188 280/503 |
| 6,986,397 B2 * | 1/2006 | Mattson | ............... | B24B 7/18 180/11 |
| 7,641,285 B2 * | 1/2010 | Jacobs | ............... | B62D 33/0625 298/1 C |
| 8,662,218 B1 * | 3/2014 | Horn | ............... | B62D 51/02 180/14.2 |
| 2004/0000440 A1 * | 1/2004 | Sawyer | ............... | A61G 5/047 180/13 |
| 2004/0238241 A1 * | 12/2004 | Mitchell, Jr. | ............... | B62B 3/001 180/19.3 |

FOREIGN PATENT DOCUMENTS

| | | |
|---|---|---|
| DE | 20 2010 011 794 U1 | 12/2010 |
| WO | WO 2007/013084 A1 | 2/2007 |

* cited by examiner

COUPLABLE DRIVE UNIT AND STEERING UNIT

CROSS-REFERENCE TO RELATED APPLICATIONS

This application is a divisional of U.S. patent application Ser. No. 13/523,052 filed on Jun. 14, 2012 (now abandoned).

TECHNICAL FIELD

This application relates to a drive unit for coupling to a steering unit for a multi-axle vehicle for conveying a passenger.

BACKGROUND OF THE INVENTION

Vehicles for conveying a passenger are known from the prior art, said vehicles consisting of a drive unit and a control unit, which may be coupled together and form the multi-axle vehicle.

Thus, for example, a motor-driven two-track land vehicle is disclosed in U.S. Pat. No. 3,583,510, which is incorporated herein by reference, said vehicle comprising a rear portion with a frame and an internal combustion engine as well as a tiller. The tiller is connected in an articulated manner to a single-axle front portion which, in a connected state, is configured for controlling the land vehicle. In a decoupled state, the single-axle front portion may be used as a hand-guided golf trolley.

Such vehicles have the drawback that, hitherto, use of the vehicle has been awkward and uncomfortable. Thus, for example, the coupling of the front portion to the rear portion is a drawback, because the coupling device uses a locking bolt, as the individual parts may be easily lost when dismantling and assembling and also easily released in the coupled state.

Moreover, such vehicles are only able to be controlled with great difficulty and awkwardly and due to their higher construction tend to tip up easily over the rear axle or to the side. This phenomenon occurs increasingly, in particular on terrain with ascents and descents, such as for example in the intended field of use on golf courses. Also, depending on the corresponding driving situation, there is the risk that the vehicle is not able to be steered or only to a limited degree, due to an unloaded front portion, or a limited traction or braking action is present due to an unloaded rear portion. If the vehicle tilts too much or tips over and in this case the driver and/or a passenger does not manage quickly enough to make the vehicle safe in time, there is the risk of severe injury, in particular in the case of the person being wedged under the vehicle which has tipped over.

Moreover, a specifically configured device is required for the front portion, which is accordingly configured to be able to be coupled and thus results in corresponding costs.

Accordingly, it would be desirable to provide a vehicle which comprises a drive unit and a steering unit which may be coupled thereto, and at least partially reduces or even eliminates at least several of the aforementioned drawbacks.

SUMMARY OF THE INVENTION

According to the system described herein, a drive unit is provided for coupling to a steering unit for a multi-axle vehicle for conveying a passenger, comprising
 a chassis which is configured as a supporting structure of the drive unit,
 a drive module comprising a motor and a first axle with wheels for driving the vehicle,
 a coupling device for coupling the drive unit to the steering unit,
 an operating element for operating the drive module, and
 a seat arrangement for supporting the passenger.

Moreover, the drive unit is configured such that a total center of mass of the drive unit is arranged in the longitudinal direction of the vehicle in front of the first axle.

This provides that in a coupled state the drive unit and the steering unit form together the multi-axle vehicle which may serve for transporting a passenger, in particular a driver. To this end, the drive unit provides the at least one first axle which comprises in each case at least one wheel on a left-hand end and on an opposing right-hand end of the axle. Using the coupled steering unit an axle with at least one wheel, in many cases at least two wheels, is also provided so that the vehicle is configured to have at least two axles as a three-wheeled or four-wheeled vehicle.

The disclosed drive module for driving the vehicle comprises the motor which, for example, is configured as an electric motor. Naturally, in principle, the use of an internal combustion engine is also possible. The drive module is operated using an operating element which, for example, may comprise an accelerator pedal and/or a brake pedal and thus permit control of the motor. Also, the operating element may comprise a control module which is described below in more detail, comprising switches and control units for further functions of the vehicle, for example a gear change of a gear unit or a reversal of the direction of rotation of the motor for driving of the vehicle in reverse, a speed control, a change of direction and/or steering control, a start-up delay, a damping control unit of a vehicle suspension, a charging and discharging controller for an energy store, an overload protection and further control and monitoring functions of the vehicle, such as a level indicator of the energy store, a remaining range, a distance traveled, a required time, navigation data, etc.

Moreover, the control module and/or the entire operating element may comprise an additional damping control for damping changes in the movement of the vehicle, in particular a damping control for a possible smooth start-up and/or braking of the vehicle and/or, in the event of a gear change, damping for a smooth, jerk-free gear change.

The operating element may, depending on the embodiment, be connected fixedly to the vehicle or be provided as a removable component.

The coupling device which is also described is provided and configured to provide a connection between the drive unit and the steering unit. The coupling device may be designed to be able to be handled as simply and reliably as possible. Exemplary embodiments are described hereinafter.

The seat arrangement is provided in order to provide one or more passengers with safe and comfortable support on the vehicle. It is also described in more detail below.

The drive unit and thus the vehicle may also have a particularly secure position and/or also a high degree of driving safety when driving, in particular even on difficult terrain. This includes, in particular, terrain with ascents and descents, so that safe uphill and downhill driving is possible, without the multi-axle vehicle tipping over. Also prevented are a reduced steering action by the wheels of the steering unit lifting or a loss of braking performance by too great an unloading of the first axle of the drive unit. This is achieved by the drive unit, according to the description which has already been provided, being configured such that the total center of mass is arranged in front of the first axle.

This disclosed relative position of the total center of mass relates to a longitudinal direction of the vehicle, so that in each case an orientation is understood relative to the direction of travel of the vehicle. The total center of mass in the direction of travel of the vehicle is thus in front of the first axle, which accordingly is arranged counter to the direction of travel behind the total center of mass and thus forms a rear axle of the vehicle.

In order to design the drive unit in a safe and stable manner, and to achieve a desired position of the total center of mass, the centers of gravity of individual components may be adjusted to one another, in combination with adapted spacings between said components from the first axle, so that moments of the total center of mass occurring around the first axle may be kept as small as possible. In this manner, the required axle load both of the steering unit and, in particular, also the drive unit is ensured so that optimal handleability and/or steerability of the steered wheels as well as sufficient traction of the drive wheels is achieved. Due to the disclosed position of the total center of mass, torques which occur when accelerating or braking do not have a negative effect on the individual axle loads.

Naturally, however, not every gradient is able to be safely driven upon. Instead, the information provided in the description is understood to refer substantially to terrain such as that which is generally driven over by such vehicles. This terrain is, for example, roads, lanes, farm tracks and easy terrain. Difficult terrain, such as for example that which may be encountered on golf courses, may also be driven over. An optimal spacing of the total center of mass from the first axle is described below with reference to the figures. The drive unit may be adjusted so that a tipping torque is arranged in the vicinity of the total center of mass.

According to an embodiment, the drive module also comprises an energy store for operating the motor and/or also at least one second axle with wheels, wherein the second axle is arranged in the longitudinal direction of the vehicle in front of the first axle and parallel thereto.

For example, a rechargeable battery for providing electrical energy for the motor configured as an electric motor is considered as the energy store. In particular, lithium ion rechargeable batteries or gel batteries may be used. Optionally, the energy store may be configured to be easily replaceable.

In the case of an internal combustion engine, corresponding fuels such as for example petrol, diesel or hydrogen have to be provided in correspondingly suitable containers. Naturally, also other known alternative energy sources may be provided for operating the motor. Due to the usual considerable weight of the energy store, this is also arranged such that the total center of mass of the drive unit is also arranged in front of the first axle, in order to achieve the stable action described above. This may be achieved by the energy store also being arranged in front of the first axle.

Also the disclosed design contributes to the stability of the vehicle and/or the drive unit, according to which the at least one second axle may also be provided. For example, the second axle may be arranged in front of the first axle at a short distance therefrom, so that a double axle is provided. In this case, however, the "first axle" remains the rearmost axle to which all information relating to the position and action refers. Thus, the total center of mass also has to be located in front of the first axle. However, such an embodiment has the advantage of a smaller surface loading of the ground due to a larger bearing surface.

According to a further embodiment, the motor comprises a motor shaft which is arranged parallel to the first and/or the second axle and using a transmission device transmits a rotational movement of the motor shaft into a rotational movement of the first and/or the second axle and/or the respective wheels for driving the vehicle.

This provides that the motor with its motor shaft is also aligned parallel to one of the axles. In this manner, the motor may be positioned with the smallest possible spacing from the axles, so that the center of mass of the motor also is at a short distance from one of the axles. Due to the resulting short lever arm, a rotational and/or tipping moment is reduced. The motor may be arranged directly above or in front of the first axle. As a transmission device, for example, gear drives with or without a gear shift or a belt or chain drive are considered. Other known systems for transmitting a rotational torque may also be used.

Moreover, the first axle and/or the at least one second axle in each case may comprise a differential. Thus the wheels arranged on the axles may be decoupled from one another using the differential and/or the corresponding differential gear, in order to ensure sufficient traction, in particular when a wheel slips on corresponding ground, for example slippery ground or grass. The mode of operation of a differential is generally known, so that no further details will be provided of the mode of operation and function thereof.

The differential may be arranged relative to the longitudinal direction of the vehicle to the left or right adjacent to the motor, so that the motor may be installed as close as possible to the axle, and thus an overall size which is as small as possible is obtained, whereby a low center of gravity may also be achieved.

According to a further embodiment, the motor comprises at least one pair of hub motors with in each case a motor shaft, wherein the two motor shafts of the pair of hub motors together form the first or the second axle, and in each case one of the hub motors is associated with a left-hand wheel and the other hub motor is associated with the right-hand wheel of the first or the second axle. This provides that the hub motors are directly connected to the respective wheel to be driven. Thus a decentralized drive of the wheels results, in contrast to a central drive using a single motor. Thus gears and axle shafts may be dispensed with, whereby additional weight may be saved. Moreover, this embodiment permits a particularly advantageous concentration of the motor mass in the region of the axles. In this case, the disclosed "axles" are understood as virtual axles, as only the respective shafts in the hub motors and/or in the wheels are present, but not continuous axles. However, these are to be understood as the relevant axles in the sense of this description.

A center of mass of the seat arrangement may also be arranged in an unloaded state and/or in a state loaded by a passenger in the longitudinal direction of the vehicle in front of the first axle. For example, a seat arranged raised relative to the drive unit and the drive module thereof may be provided as a seat arrangement in order to provide the passenger and/or the driver with a seating option. This seat may be designed as a seat with a seating surface and a backrest angled relative thereto.

Alternatively, however, a saddle-shaped seat bench may also be used for one or more passengers. This permits a passenger advantageously to shift his/her position and thus the body weight depending on the terrain which is respectively being driven over and an optimal center of gravity on the seat bench. Thus when climbing hills, as the passenger "slips forward" the center of gravity is brought forward and, as a result, additional security is provided against the tipping up of the vehicle to the rear.

A point of introduction of a weight force of the seat arrangement onto the chassis may also be arranged in front of the first axle. The same arrangement may also advantageously be provided for the center of mass of the seat arrangement, either in a state loaded with a passenger or even in an unloaded state.

According to a further embodiment, the chassis comprises a rigid frame 156 which is configured, in particular, to be dividable or foldable, and/or also comprises footrests for positioning the feet of the at least one passenger and/or a driver, wherein the footrests are arranged in the longitudinal direction of the vehicle in front of the first axle. The rigid frame 156 prevents the drive unit from twisting and thus inadvertent shifting and/or displacement of the total center of mass so that a stable driving situation and a greater overall stability of the vehicle is achieved. The frame 156 may, for example, be made from steel, light metal and/or fiber-composite materials, in particular carbon fiber, or glass fiber material.

Additionally and optionally, the frame 156 may be designed according to the description to be dividable or foldable. This permits the space requirement of the drive unit to be reduced, so that the drive unit and/or the entire vehicle may be more easily transported and to this end, for example, loaded in a boot of a passenger motor vehicle. To this end the drive module may also be designed to be removable from the chassis, so that the drive module is separately loaded and the remaining chassis is dividable and/or foldable. In addition to the divisibility of the frame 156, specifically a general capacity for disassembly of the vehicle, in particular the drive unit may be provided. To this end, the seat arrangement and/or a vehicle cladding, in particular a cladding of the energy store or the motor may be designed to be removable. Moreover, the drive module and/or the energy store may be optionally removable. Each of the removable components may be connected in an easily releasable manner to the chassis with the facility to be rapidly taken apart and thus may be removed therefrom. Corresponding devices for the releasable fixing of such components are known, so that the design and mode of operation thereof is not described in more detail.

The disclosed footrests are provided in order to ensure a defined position and secure support of the passenger and/or the driver on the seat of the drive unit. Said footrests permit the feet to be supported and thus result in the passenger adopting a specific predefined position. In this manner, the center of mass of the passenger may be substantially predetermined and positioned. The center of mass may also be located in front of the first axle. A value regarded as optimal for the spacing of the footrests from the front axle is described below.

The disclosed footrests may be fastened to the side of the drive unit and/or the chassis and if possible arranged such that said drive unit and/or chassis do/does not enter within the steering radius of the steering unit, if said steering unit is accordingly struck. The lateral arrangement of the footrests permits optimal compensation of the weight of the passenger when driving in an oblique position or on uneven ground.

According to a further embodiment, the motor comprises a motor shaft 152 which is arranged parallel to the first and/or the second axle and using a transmission device transmits a rotational movement of the motor shaft 152 into a rotational movement of the first and/or the second axle and/or the respective wheels for driving the vehicle.

Accordingly, in addition to a purely rigid axle suspension it is also possible to provide a resilient design by utilizing a suspension system which may include various types of suspension components 211 and 212 (schematically shown). For example, a separate spring arm suspension component for each individual wheel of one respective axle may be provided so that a separate wheel suspension is provided. Also a complete axle may be articulated to the chassis using spring arms, so that a split axle and/or a movably mounted rigid axle is provided. Additionally, known suspension systems for vehicles utilize springs as suspension components, i.e. including spiral and/or leaf springs as well as elastomeric dampers. Moreover, the damping behavior may be improved with shock absorbers as suspension components, in particular pneumatic or hydraulic systems.

The embodiment of such a resilient suspension permits improved mobility on terrain and safer driving behavior, in particular off-road, as improved ground contact may be achieved even with uneven terrain. Additionally, the driving comfort is improved on all types of ground.

Moreover, the coupling device may comprise a tiller, in particular a tiller configured to be rigid, steerable, foldable, dividable and/or removable. This may be part of the chassis and extends in the longitudinal direction away from the drive module for coupling the entire drive unit to the steering unit. A divisibility of the tiller makes it possible to dismantle the drive unit at least partially in order to be able to transport it more easily. To this end, the tiller may alternatively be designed to be completely removable.

For example, the coupling device may also comprise a plug connection for the pluggable connection of the drive unit to the steering unit or a spherical head coupling 160 for connecting the drive unit to the steering unit. In principle, all known coupling devices may be provided which are suitable for such a coupling. However, the pluggable connection may be provided in order to provide a more secure, rapid and easily handleable connection to the steering unit, so that the drive unit may be decoupled from the steering unit and coupled thereto in a simple manner. A spherical head device 160 also provides the aforementioned advantages. In this case, a spherical head 160 may be provided on one of the two elements to be connected—the coupling device of the drive unit or steering unit. This is encompassed in a rotatably movable manner by a receiver configured in each case on the other element, so that the steering unit for steering the drive unit using the spherical head device 160 is pivotable relative thereto around all spatial axes. The spherical head coupling 160 may also comprise a safety device against inadvertent decoupling.

In addition, it is possible for the drive module to comprise a suspension device for connecting to a suspension system (also referred to in short hereinafter as "suspension unit"), in particular a suspension system configured for transporting at least one further passenger. To this end, the suspension device may be arranged on the rear of the vehicle and/or on the corresponding rear side of the drive unit and coupled to a suspension unit which may be ridden upon. In particular, already known coupling devices for suspension units are considered as suspension devices. The suspension device may, however, also be connected to the drive unit such that the suspension unit acts as a support for the vehicle and/or the drive unit. An axle of the suspension unit and/or the wheels fastened thereto thus act as supporting wheels in order to support and thus prevent a tipping movement of the vehicle to the rear.

According to another embodiment, the suspension unit may comprise a footplate for transporting a person standing thereon. Additionally, one or more grips for the person standing on the suspension unit may be provided on the suspension unit or on the drive unit.

As already mentioned above, the drive unit may comprise brakes which are configured to introduce a braking action for braking the vehicle on the first axle and/or on at least one second axle and/or on at least one of the wheels, if required. Thus the brakes may optionally be attached to an axle or a plurality of axles and/or wheels. In particular, magnetic brakes or drum brakes and disk brakes may be used but also a motor brake or other known braking systems may be used. The brakes are actuated by the passenger and/or the driver of the vehicle via the aforementioned operating element.

The operating element may comprise foot pedals or brake levers. Instead of being arranged on the drive unit, said foot pedals or brake levers may also be arranged on the steering unit, for example similar to the brake levers of a bicycle handlebar, or be able to be attached as a separate device in the form of the control module described below.

Moreover, the wheels may be provided with tires adapted to the terrain to be driven over. On uneven terrain with loose ground, or on grass, it is possible to provide a broad contact surface with a correspondingly broad tire. Thus, for example, roller-like tires, balloon tires or air-inflated tires may be provided. By deflation of air, air-inflated tires permit an adaptation to the terrain for improved traction. The tires may be dimensioned in their width such that they are able to maintain the drive position and the steering position, without damaging the terrain. This is, for example, advantageous on the fairway of a golf course.

Additionally, a steering unit is provided for coupling to the described drive unit. The steering unit comprises at least one axle with wheels. In particular, the steering unit may be configured such that in a state decoupled from the drive unit the steering unit forms a separate, useable, drivable vehicle with the at least one axle, and may be selected from a group consisting of a golf trolley, a trolley, a walking frame and a rollator, and/or the steering unit is configured for receiving bags, golf bags, suitcases, boxes and/or seats.

Thus the steering unit is designed to be decoupled from the drive unit and in this state is able to be used guided by hand. In order to connect the steering unit in a coupled state to the drive unit, the steering unit may comprise a mating piece for receiving the coupling device of the drive unit. As already described, a plug connection may also be provided for the connection, said plug connection providing the advantage of particularly simple and rapid handleability.

Due to the capacity for decoupling, for example, the steering unit is able to be easily replaced by a different steering unit if required. Thus, for example, the golf trolley may be replaced by a walking frame or a shopping trolley. In this case, the steering unit may be configured to have one or two axles with one, two, three or four wheels. Naturally, however, more than two axles and/or more than four wheels are also possible. At least one of the wheels may also optionally be configured as a so-called "swivel" wheel or to be rigid. Moreover, the at least one axle or the at least one wheel of the steering unit is able to be braked. Also, known braking systems may be used, such as disk brakes, magnetic brakes, drum brakes, etc. Moreover, the steering unit may be of multi-part design and may be dividable or even able to be folded up, in order to permit easy transportation.

In any case, however, the steering unit serves to be used for steering the vehicle by the passenger of the vehicle. The steering unit thus has to be connected in an articulated manner to the drive unit, in order to be able to carry out a steering movement, which the drive unit then follows. To this end, the steering unit comprises, in particular, a steering portion similar to a bicycle or motorcycle handlebar or a grip portion of the aforementioned vehicle. In this case, therefore, changing the direction of the vehicle takes place by changing the direction of an axle of the steering unit about the centerpoint thereof.

Alternatively, a rigid connection of the steering unit to the drive unit is also possible. But in this case, however, the steering unit has to have a steerable axle, i.e. wheels pivotable relative to the steering unit and/or the drive unit, similar to a passenger motor vehicle. This may take place, in particular, using king pin steering of the individual wheels. Naturally, according to the above view a corresponding suspension of the steering unit is possible for the suspension of the drive unit.

For example, the vehicle may comprise a child seat on the steering unit, as a seat.

Moreover, the steering unit may comprise a control module for regulating and controlling the drive unit, in particular a removable control module. This is a physical or at least logical component of the described operating element and permits some of the described functions of the operating element, such as for example the speed, the brakes and/or a horn or the like to be controlled remotely from a central control module. This is arranged on the steering unit for improved and easier operability by the driver. However, in order to achieve easy divisibility of the vehicle in the steering unit and drive unit, for example for transportation purposes, the control module is configured to be removable from the steering unit. Thus costly releasable electrical connections do not have to be provided between the steering unit and the drive unit.

Moreover, a multi-axle vehicle for conveying at least one passenger may be provided, comprising a drive unit and a steering unit coupled to the drive unit, wherein the drive unit and the steering unit in each case are configured according to the description.

According to an embodiment of the multi-axle vehicle, the steering unit in the coupled state is arranged tilted about an axle of the steering unit and/or in the coupled state is releasably connected in terms of communication technology to the drive unit for transmitting control signals from the control module of the steering unit to the drive unit, in particular to the drive module.

The described tilting of the steering unit is provided, in particular, in the case where the steering unit comprises more than one axle and/or additional wheels, in particular support wheels. In this case, the steering unit may be tilted about an axis of the steering unit in which the further axles and/or wheels are lifted and thus no longer have ground contact. In this manner, the steering unit and thus the entire vehicle is able to be steered more easily.

In particular, using a slight conversion, in particular by simply attaching a mating piece for the coupling device of the drive unit to the steering unit in a simple and cost-effective manner, the described use of known vehicles permits the possibility of converting said vehicles for use with the drive unit.

In particular, the use of the walking frame and/or the rollator offers the possibility of providing a corresponding vehicle for disabled people which is easy to handle but also easy to transport, so that a particularly advantageous possibility for increased mobility may be provided for the user.

Moreover, the vehicle and/or the components thereof, i.e. the steering unit and the drive unit, may comprise additional devices, such as for example additional and complementary parts, in particular lights and reflectors, in order to equip the vehicle for use in public road traffic. Depending on the country, according to the respective road traffic regulations, different standards have to be met in order to obtain corresponding road worthiness for the vehicle.

BRIEF DESCRIPTION OF THE DRAWINGS

Embodiments of the system described herein are explained hereinafter with reference to the accompanying drawings, in which.

DETAILED DESCRIPTION OF VARIOUS EMBODIMENTS

Figure 1:
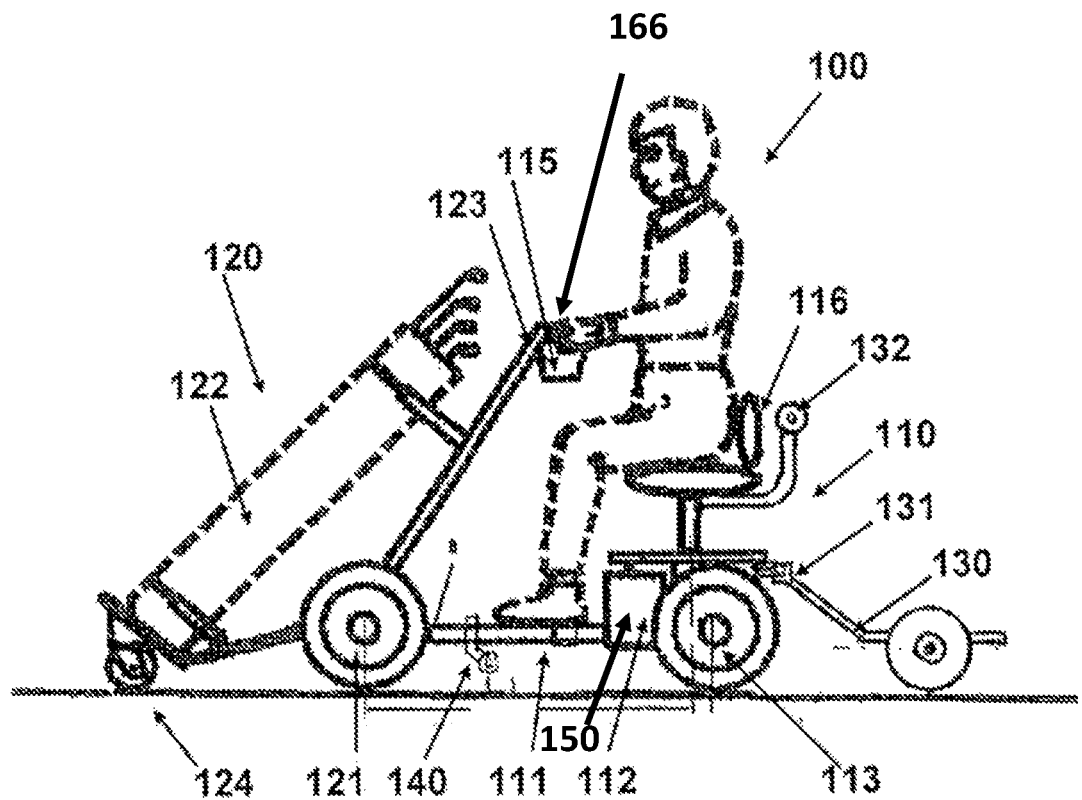
FIG. 1 shows a side view of a first embodiment of a vehicle according to the system described herein.
Figure 2A:
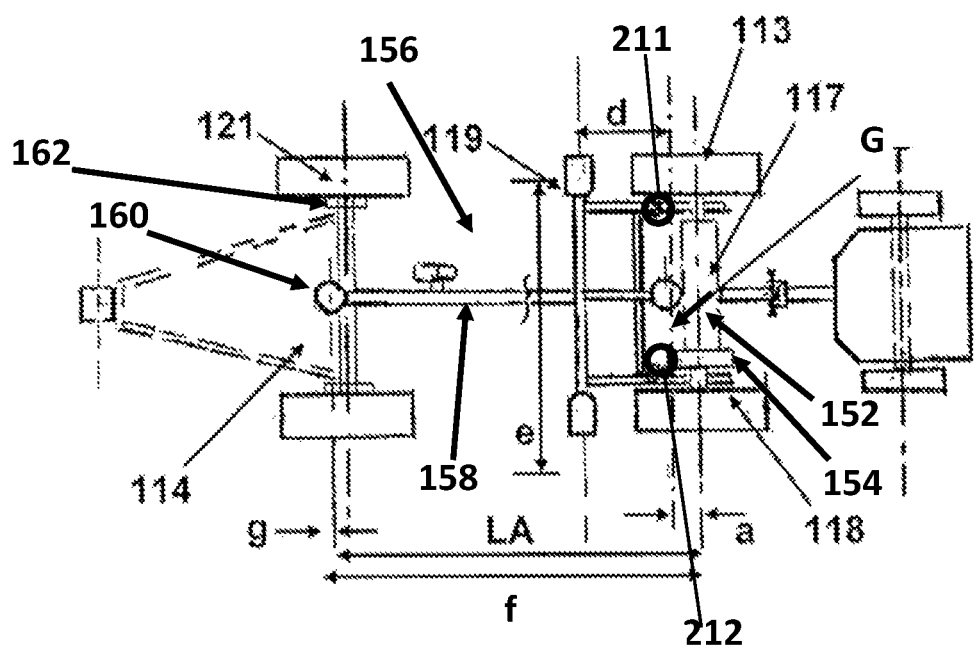
FIG. 2A shows a plan view of the first embodiment of the vehicle according to the system described herein according to FIG. 1, with a drive unit having a single motor.
Figure 2B:
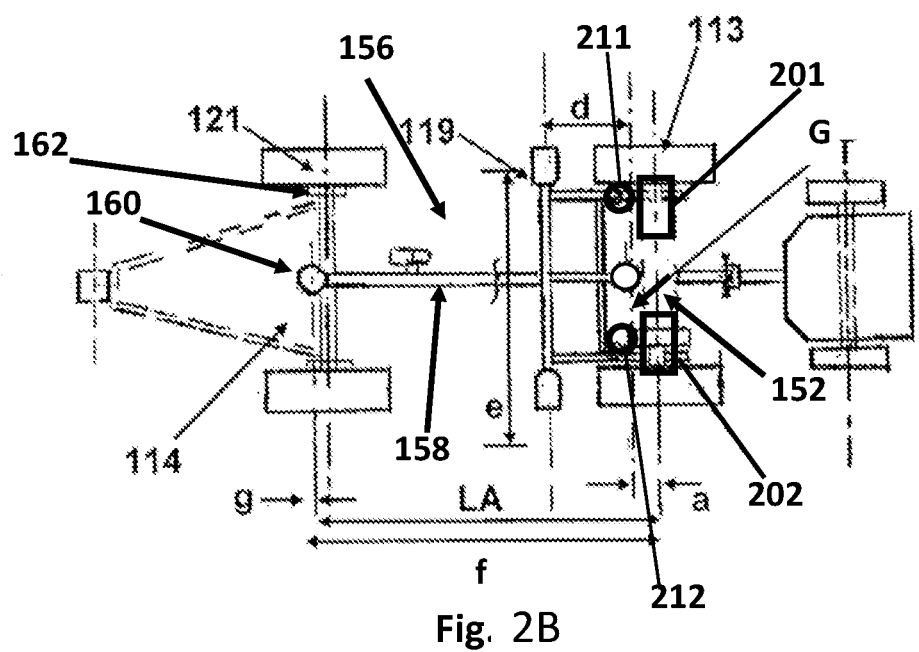
FIG. 2B shows a plan view of the first embodiment of the vehicle according to the system described herein according to FIG. 1, with a drive unit having a pair of hub motors.

FIG. 1 and FIG. 2 show a first embodiment of a vehicle 100 according to the system described herein with a drive unit 110, a steering unit 120 and a suspension unit 130. The drive unit 110 comprises a chassis 111, which is configured as a supporting structure of the drive unit 110. A drive module 112 is also included, which comprises a motor 117 and an energy store 150 for driving the motor 117. For driving the first axle 113, the motor 117 is coupled to said axle using a gear unit 118. Moreover, the drive unit 110 comprises a tiller 158 with a coupling device 114 which is provided for the pivotable and thus steerable coupling of the drive unit 110 to the steering unit 120 and in the coupled state ensures a secure connection of both elements. The drive unit 110 may thus be decoupled from the steering unit 120, so that the steering unit 120 is able to be used in a manner in which it is removable and hand-guided. The drive unit 110 may comprise an additional supporting wheel 140 for parking The drive unit 110 is configured so that a total center of mass G (position only indicated schematically) of the drive unit 110 in the longitudinal direction and/or direction of travel is arranged in front of the first axle 113 at a spacing a. As a result, a particularly high degree of driving stability is achieved even on difficult and uneven terrain. In particular, an arrangement of the drive module 112 with its components in the direct vicinity of the first axle 113 contributes to the stability. Also the seat is arranged such that a center of gravity of the seat arrangement 116 both in the unloaded state and also in a state loaded by the passenger is located in front of the first axle 113. The feet of the passenger may be positioned on the footrests 119 provided to the side of the chassis 111. In combination with the seat arrangement 116 this permits a defined seating position and thus a reproducible center of gravity of the passenger.

Moreover, an operating element 115 is provided with a control module 166, which in the embodiment shown is arranged on a steering portion 123 of the steering unit 120 configured as a grip. A connection to the drive module 112 in terms of communication technology may take place, for example, wirelessly or via a connection integrated fixedly in the drive unit 110 and the steering unit 120. Naturally, other known connection possibilities are also possible.

The steering unit 120 comprises an axle 121 as well as a front support wheel 124. In order to permit easier steerability of the steering unit 120, the steering unit 120 may be connected to the drive unit 110 so that the steering unit 120 is arranged slightly tilted about the axle 121, so that the support wheel 124 is raised from the ground. The steering unit 120 is also configured for receiving a load 122, which for example may comprise the golf bag shown but naturally also other suitable loads.

The suspension unit 130 is only optionally provided and may comprise at least one axle. Also, however, multi-axle embodiments are possible. The suspension unit 130 is connected to the drive unit 110 via a suspension device 131. This connection may be configured merely optionally such that the suspension unit 130 acts as a support, additionally in order to prevent tipping of the drive unit 110 over the first axle 113. The suspension unit 130 may be configured for transporting a further passenger. Said passenger may, for example, stand on the suspension unit and hold onto a grip 132.

The motor 117 may, for example, be configured according to the view as an electric motor. Purely by way of example, but in no way limiting the system described herein, the electric motor may be configured as a 24V, 36V or 48V DC motor. Conventionally, power values of ca. 1700 to 1800 W, in particular 1760 W may be generated. But the power of the drive motor should not fall below a minimum motor power of 800 W. As already mentioned above and described below in FIG. 7, the motor 117 (and/or 717) may be positioned so that a differential 154 is arranged to the left or right adjacent to the motor, which in turn is arranged at a short distance parallel to the axle to be driven, in order to provide a low center of gravity.

Instead of the aforementioned electric motor 117, at least one pair of hub motors 201, 202 or an internal combustion engine, in particular a motor fuel engine or fuel engine, may also be used.

Not shown in the figures is a braking device for braking the vehicle. Said braking device may, for example, comprise a motor brake or an electrical magnetic parking brake. Also not shown, but optionally able to be provided, is a reverse gear and a decoupling of the differential by a mechanical lever.

A braking device 162 for braking the vehicle may, for example, comprise a motor brake or an electrical magnetic parking brake. Also not shown, but optionally able to be provided, is a reverse gear and a decoupling of the differential by a mechanical lever.

Figure 3:
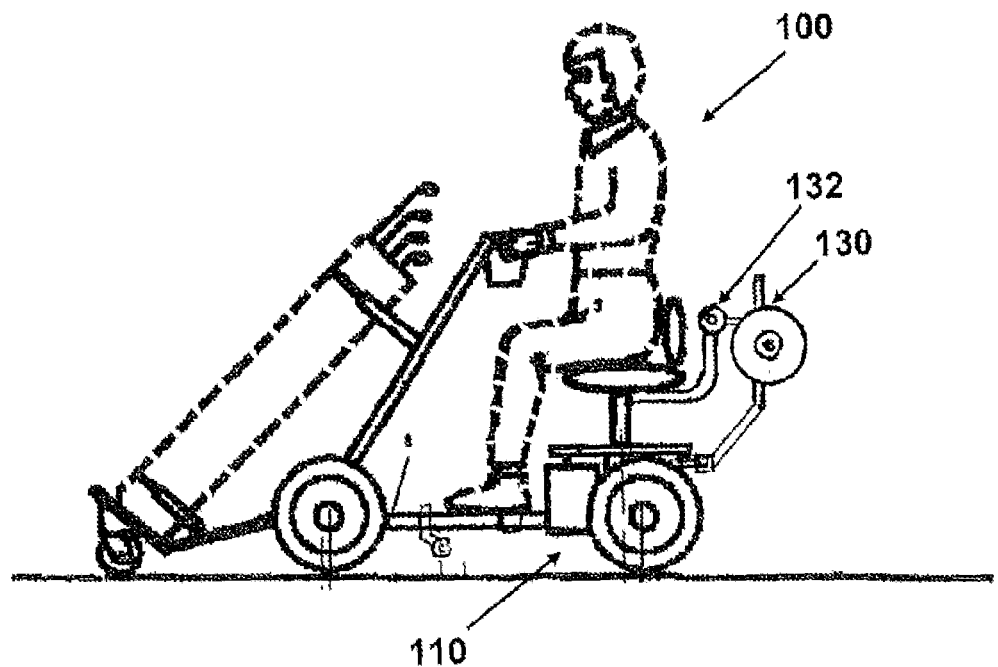
FIG. 3 shows a side view of the first embodiment of the vehicle according to the system described herein according to FIGS. 1 and 2 with the suspension folded up.
Figure 4:
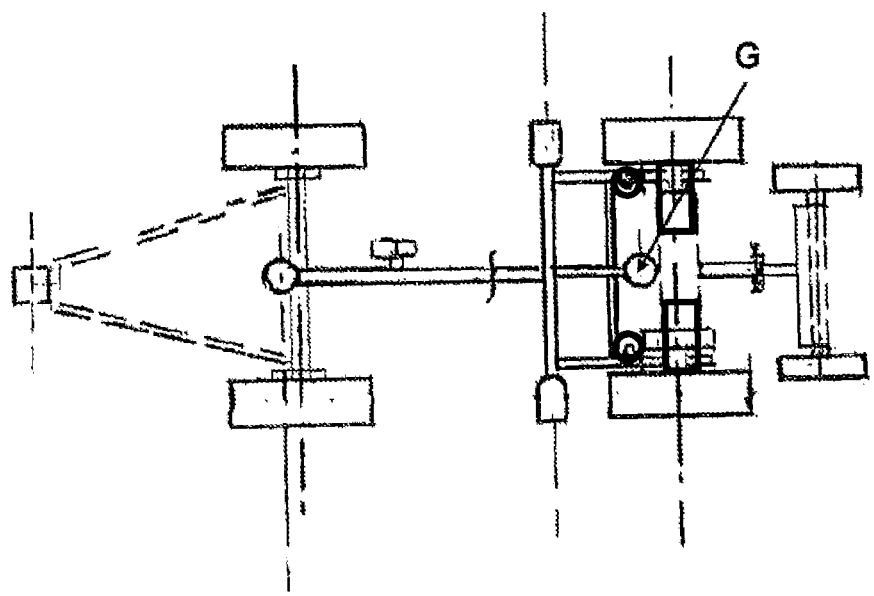
FIG. 4 shows a plan view of the vehicle according to the system described herein according to FIG. 3.

FIG. 3 and FIG. 4 show the first embodiment of the vehicle 100 according to the system described herein according to FIGS. 1 and 2, so that reference is made to the description provided. In contrast to FIGS. 1 and 2, however, the suspension unit 130 is optionally folded up and thus without ground contact. To this end, the suspension unit 130 may, for example, be releasably fastened to the grip 132.

Figure 5:
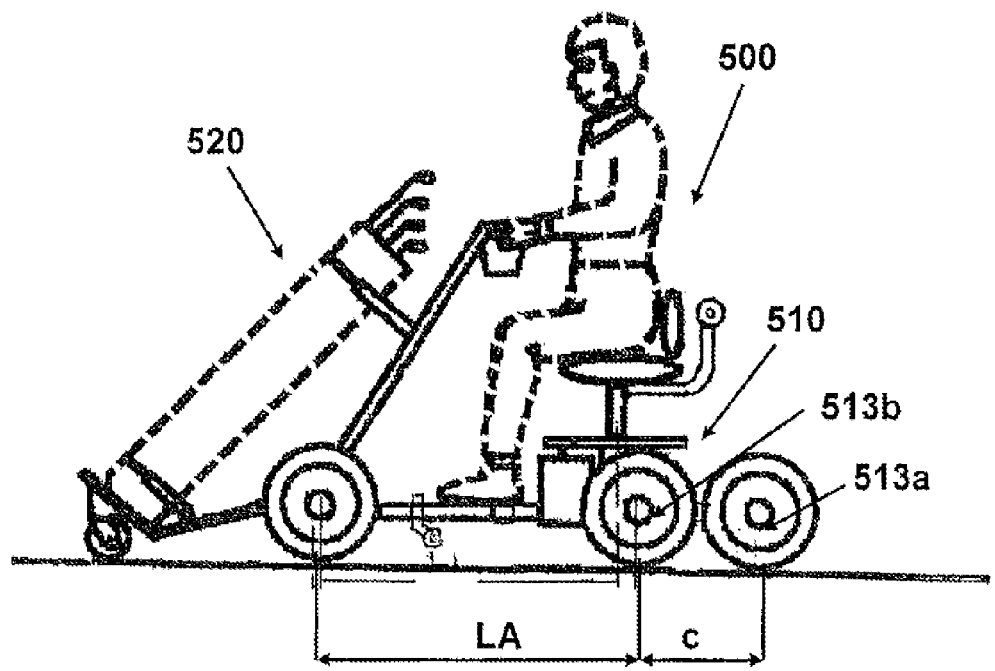
FIG. 5 shows a side view of a second embodiment of a vehicle according to the system described herein.

FIG. 5 and FIG. 6 show a side view of a second embodiment of a multi-axle vehicle 500 according to the system described herein with a drive unit 510 and a steering unit 520 coupled thereto. The steering unit 520 is configured corresponding to the embodiment described in FIGS. 1 to 4, so that reference may be made to the description provided. Also, the essential features of the drive unit 510 coincide with the drive unit 110 described there.

Figure 6A:
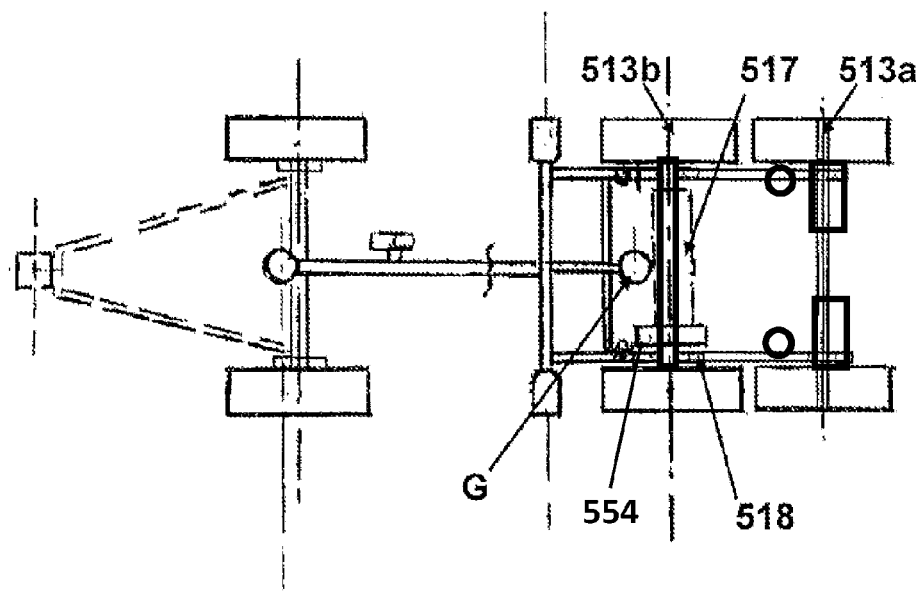
FIG. 6A shows a plan view of the second embodiment of the vehicle according to the system described herein according to FIG. 5, with a drive unit having a single motor associated with a second axle.
Figure 6B:
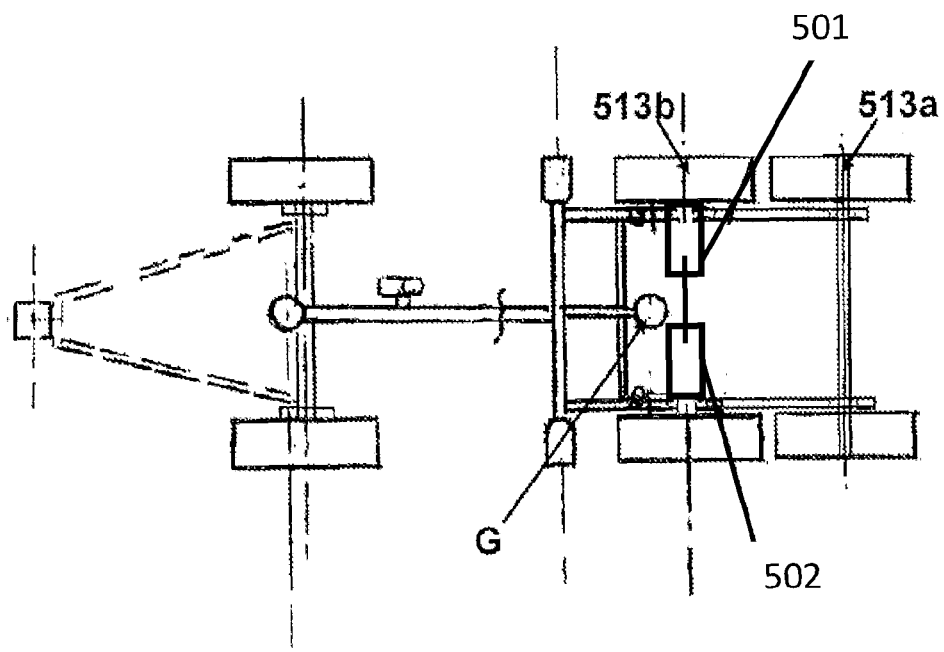
FIG. 6B shows a plan view of the second embodiment of the vehicle according to the system described herein according to FIG. 5, with a drive unit having a pair of hub motors associated with a second axle.

Differences, however, are present in one embodiment of the axles of the drive unit 510. The drive unit 510 provides, in the second embodiment shown, a double axle with a first axle 513a and a second axle 513b. In direct comparison to the first embodiment, the second axle 513b replaces the first axle 113 described in FIGS. 1 to 4, wherein the first axle 513a is the rearmost axle viewed in the longitudinal direction of the vehicle and/or in the direction of travel, and is arranged behind the second axle 513b. Using the double axle provides an additional driving stability and, in particular, a stability against tipping up may be provided. In this case, the second axle 513b is driven by a motor 517 via a gear unit 518, as shown in FIG. 6A. Similar to the first embodiment, the motor 517 may be positioned so that a differential 554 is arranged to the left or right adjacent to the motor 517. The first axle 513a is, however, not driven. Naturally, the first axle 513a may also be driven or configured to be driven alone instead of the second axle 513b. Also, similar to the first embodiment, a pair of hub motors 501 and 502 may be used instead of the motor 517 to drive the second axle 513b, as shown in FIG. 6B.

Figure 7:
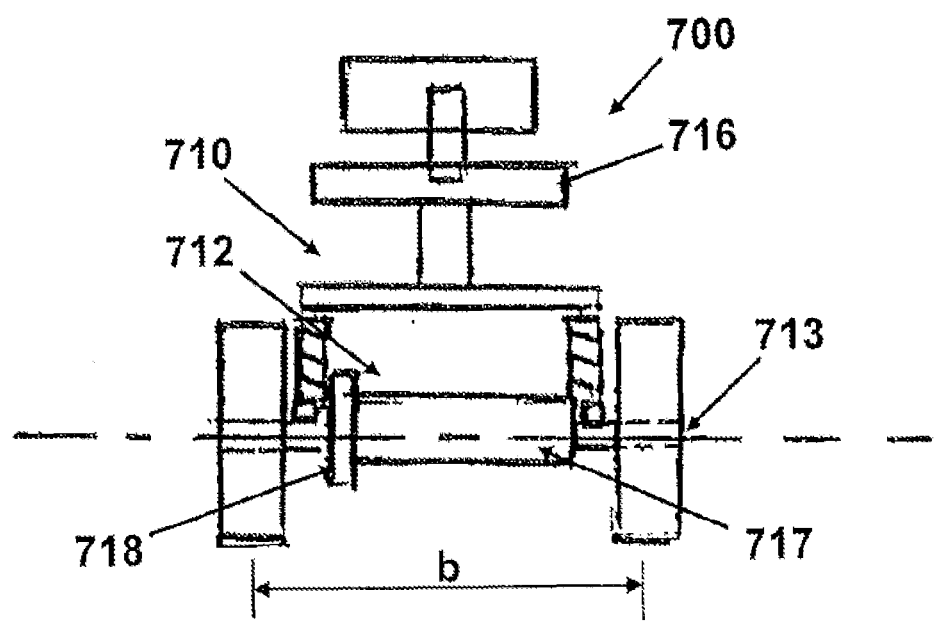
FIG. 7 shows a rear view of the vehicle according to the system described herein.

FIG. 7 shows a rear view of a multi-axle vehicle 700 with the drive unit 710 thereof comprising a drive module 712 and a seat arrangement 716. The drive module 712 comprises a first axle 713 on which in each case a wheel is provided on a left-hand end and on a second end arranged opposite. The drive module 712 also comprises a motor 717 which is coupled via a gear unit 718 to the first axle 713 for driving the vehicle 700. According to the view, the motor 717 is arranged in the vicinity of the axle and parallel thereto, so that a particularly low, and thus advantageous, center of gravity results.

With reference to FIGS. 1 to 7, for clarifying particularly advantageous proportions of the vehicle 100, 500 and 700 in FIGS. 1 to 7, specific dimensions refer hereinafter and purely by way of example to a defined length unit LA of the vehicle. This length unit LA is formed by the spacing of the first axle 113 and/or second axle 513b from the axle 121 and/or 521 of the steering unit 120, 520.

Accordingly, an advantageous width of the tires of the drive unit is 6.5% to 11% of LA, so that a possible small surface loading with good handleability results. A wheel diameter on the first or second axle of the drive unit may, for example, have a component of between 22% and 38% of LA, particularly 35% of LA.

With reference to FIG. 7, a track width b of the drive unit, for example, is 54% to 87% of LA, particularly 65% of LA.

The vehicle is advantageously designed such that a total center of mass in the case of a single axle of the drive unit (FIG. 1 to FIG. 4) is positioned at a spacing a of 5% to 20% of LA in front of the single axle (first axle 113), particularly at a spacing of 12% of LA. In the case of a double axle or a plurality of axles, the length unit is defined by the spacing of the axle 121 of the steering unit 520 from the second axle 513b and correspondingly the total center of mass is located at least in the aforementioned spacing a in front of the first axle 513a, but particularly from the second axle 513b.

In the aforementioned case of a double axle (see FIGS. 5 and 6) a minimum spacing c of the first axle from the second axle is dependent on a wheel diameter and has to be selected to be correspondingly larger. If, for example, a selected wheel diameter is 34% of LA, a value of 37% of LA may thus be selected as the spacing c.

An exemplary arrangement of the footrests may be at a spacing d of 20% to 30% of LA from the total center of mass G. A lateral spacing e of the footrests from one another may also be, for example, between 60% to 80% of LA, particularly 72%.

The seat arrangement may, for example, have a minimum height h above the ground of 50% to 87% of LA. The seat height may be between 56% for a body height of 140 cm and 87% for a body height of 210 of a driver.

The tiller, which is also described, may on its front end comprise the coupling device, wherein a spacing f between the coupling device, in particular a head coupling point for directly connecting to the steering unit from the first axle or the second axle, is for example 80% to 110% of LA, in particular 102% of LA.

Also, exemplary values may be provided for the steering unit. Thus a track width of the steering unit may be 40% to 70% of LA, particularly 65% of LA. Moreover, the already mentioned coupling point, i.e. the point at which the coupling takes place between the steering unit and the coupling device of the drive unit, lies in a range between 12% of LA in front of the axle 121 of the steering unit and up to 10% LA behind said axle 121 (spacing g). The spacing g may be 2.2% of LA in front of the axle 121.

The wheels of the steering unit may have a width of 6.5% to 11% of LA, resulting in the smallest possible surface loading, but with good handleability. A wheel diameter may, for example, have a component of between 22 and 38% of LA, particularly 35% of LA.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A drive unit for coupling to a steering unit for a multi-axle vehicle for conveying a passenger, comprising:
   a chassis which is configured as a supporting structure of the drive unit;
   a drive module including at least one motor and a first axle with wheels for driving the vehicle, wherein the at least one motor includes at least one pair of hub motors, each hub motor having a motor shaft, wherein the motor shafts of the pair of hub motors form the first axle and, one of the hub motors of the pair of hub motors is associated with a left-hand wheel of the first axle and the other hub motor of the pair of hub motors is associated with a right-hand wheel of the first axle;
   a coupling device for coupling the drive unit to the steering unit, wherein the steering unit, in a state decoupled from the drive unit, is a separate usable, drivable vehicle;
   an operating element for operating the drive module;
   a suspension system that includes at least one of: at least one shock absorber, at least one spring, or at least one spring arm for a resilient suspension of the first axle; and
   a seat arrangement for supporting the passenger, wherein the drive unit is configured such that a total center of mass of the drive unit is arranged in a longitudinal direction of the vehicle in front of the first axle.

2. The drive unit according to claim 1, wherein the drive module further includes an energy store for operating the at least one motor, wherein the energy store is at least one of a battery and/or a fuel container.

3. The drive unit according to claim 1, wherein the drive module further includes at least a second axle with wheels.

4. The drive unit according to claim 1, wherein a center of mass of the seat arrangement is arranged in the longitudinal direction of the vehicle in front of the first axle in at least one of: (i) an unloaded state of the seat arrangement or (ii) in a state where the seat arrangement is loaded by a passenger.

5. The drive unit according to claim 1, wherein the chassis includes a rigid frame, which is configured to be dividable or foldable.

6. The drive unit according to claim 1, wherein the chassis includes footrests configured to support feet of the passenger, wherein the footrests are arranged in the longitudinal direction of the vehicle in front of the first axle.

7. The drive unit according to claim 1, wherein the coupling device includes a tiller extending in a longitudinal direction away from the drive module for coupling the drive unit to the steering unit, wherein the tiller is at least one of: rigid, steerable, foldable, dividable, or removable.

8. The drive unit according to claim 1, wherein the coupling device includes at least one of: (i) a plug connection for the pluggable connection of the drive unit to the steering unit, or (ii) a spherical head coupling for connecting the drive unit to the steering unit.

9. The drive unit according to claim 1, further comprising:
   at least one brake configured to provide a braking action for braking the vehicle on at least one of: the first axle, at least a second axle, or at least one of the wheels.

10. A steering unit for coupling to a drive unit for a multi-axle vehicle for conveying a passenger, the drive unit including: a chassis which is configured as a supporting structure of the drive unit; a drive module including at least one motor and a first axle with wheels for driving the vehicle, wherein the at least one motor includes at least one pair of hub motors, each hub motor having a motor shaft, wherein the motor shafts of the pair of hub motors form the first axle and, one of the hub motors of the pair of hub motors is associated with a left-hand wheel of the first axle and the other hub motor of the pair of hub motors is associated with a right-hand wheel of the fist axle; a coupling device for coupling the drive unit to the steering unit; an operating element for operating the drive module; a suspension system that includes at least one of: at least one shock absorber, at least one spring, or at least one spring arm for a resilient suspension of the first axle; and a seat arrangement for supporting the passenger, wherein the drive unit is configured such that a total center of mass of the drive unit is arranged in a longitudinal direction of the vehicle in front of the first axle, the steering unit comprising:
   at least one steering unit axle with wheels, wherein the steering unit, in a state decoupled from the drive unit, forms a separate usable, drivable vehicle with the at least one steering unit axle.

11. The steering unit according to claim 10, wherein the steering unit is selected from a group consisting of: a golf trolley or a trolley.

12. The steering unit according to claim 10, wherein the steering unit is configured for receiving bags, golf bags, suitcases, boxes and/or seats.

13. The steering unit according to claim 10, further comprising:
   a control module for regulating and controlling the drive unit.

14. The steering unit according to claim 13, wherein the control module is a removable control module.

15. A multi-axle vehicle for conveying at least one passenger, comprising:
   a drive unit and a steering unit coupled to the drive unit, wherein the drive unit includes:
      a chassis which is configured as a supporting structure of the drive unit;
      a drive module including at least one motor and a first axle with wheels for driving the vehicle, wherein the at least one motor includes at least one pair of hub motors, each hub motor having a motor shaft, wherein the motor shafts of the pair of hub motors form the first axle and, one of the hub motors of the pair of hub motors is associated with a left-hand wheel of the first axle and the other hub motor of the pair of hub motors is associated with a right-hand wheel of the first axle;
      a coupling device for coupling the drive unit to the steering unit;
      an operating element for operating the drive module;
      a suspension system that includes at least one of: at least one shock absorber, at least one spring, or at least one spring arm for a resilient suspension of the first axle; and
      a seat arrangement for supporting the at least one passenger, wherein the drive unit is configured such that a total center of mass of the drive unit is arranged in a longitudinal direction of the vehicle in front of the first axle,
   and wherein the steering unit includes:
      at least one steering unit axle with wheels, wherein the steering unit, in a state decoupled from the drive unit, forms a separate usable, drivable vehicle with the at least one steering unit axle.

16. The multi-axle vehicle according to claim 15, wherein the steering unit, in a coupled state with the drive unit, is at least one of:

(i) arranged tilted about one of the at least one axle of the steering unit, or
(ii) releasably connected to the drive unit for transmitting control signals from a control module of the steering unit to the drive unit.

\* \* \* \* \*